United States Patent [19]

Miyazaki

[11] Patent Number: 5,473,225
[45] Date of Patent: Dec. 5, 1995

[54] ELECTRIC MOTOR VEHICLE CONTROL APPARATUS AND METHOD FOR REDUCING THE OCCURRENCE OF WHEEL SLIP

[75] Inventor: Akira Miyazaki, Tokyo, Japan

[73] Assignee: Kabushiki Kaisha Toshiba, Kawasaki, Japan

[21] Appl. No.: 43,845

[22] Filed: Apr. 7, 1993

[30] Foreign Application Priority Data

Apr. 21, 1992 [JP] Japan ................................ 4-101150

[51] Int. Cl.$^6$ .................................................. B61C 15/08
[52] U.S. Cl. ................................ 318/52; 318/34; 318/53
[58] Field of Search .............................. 318/52, 34, 53; 180/137

[56] References Cited

U.S. PATENT DOCUMENTS

| | | | |
|---|---|---|---|
| 4,298,940 | 11/1981 | Tadokoro et al. | 318/52 |
| 4,335,337 | 6/1982 | Okamatsu et al. | 318/52 |
| 4,757,240 | 7/1988 | Mizobuchi et al. | 318/52 |
| 4,825,131 | 4/1989 | Nozaki et al. | 318/52 |
| 5,148,883 | 9/1992 | Taraka et al. | 180/197 |
| 5,163,170 | 11/1992 | Grabowski | 318/52 |

*Primary Examiner*—William M. Shoop, Jr.
*Assistant Examiner*—Karen Masih
*Attorney, Agent, or Firm*—Foley & Lardner

[57] ABSTRACT

An electric motor vehicle control apparatus has a control circuit which includes a slip/slide detection circuit. A minimum value among the wheel speeds is used to determine a slip condition whereas a maximum value is used to determine a slide condition. A control signal controlling each of the motors driving the wheels may thus be adjusted for the detected slip or slide condition. The control signal may also be generated based on different diameter wheels resulting from frictional induced diameter variations.

11 Claims, 8 Drawing Sheets

ELECTRIC MOTOR VEHICLE CONTROL APPARATUS AND METHOD FOR REDUCING THE OCCURRENCE OF WHEEL SLIP

BACKGROUND OF THE INVENTION

1. Field of the Invention

This invention relates to an electric vehicle control apparatus which is connected to a plurality of motors provided in an electric vehicle and which controls the speeds of the motors individually.

2. Description of the Related Art

An inverter apparatus has been conventionally used as an electric vehicle control apparatus. Traditionally, in this conventional method only one inverter apparatus is used to control a plurality of motors. However, recently, consideration has been given to the fact that the diameters of a wheels powering the electric vehicle are changed by friction which is generated between the rail and the wheels over time. The changes in diameter are different for each wheel. Hence it has been understood that the wheels needed to be controlled individually. Accordingly, a method has been employed in which a plurality of inverter devices are connected respectively to each motor so that they may be individually controlled. Such a conventional individual control method will now be described in relation to FIG. 1.

FIG. 1 shows the control structure of an electric motor vehicle control apparatus using the conventional individual control method. In FIG. 1, inverter apparatuses $IV_1$ through $IV_4$ include main circuits $T_1$ through $T_4$ and control circuits $C'_1$ through $C'_4$, respectively. Electric power from a pantograph 1 is provided to main circuits $T_1$ through $T_4$ through a breaker 2. Induction motors $M_1$ through $M_4$ are controlled individually in response to the outputs from the main circuits $T_1$ through $T_4$.

Control circuits $C'_1$ through $C'_4$ receive a notch command n (speed increase/decrease) and a direction command F/R (forward/reverse) from a main controller 3. Further, the control circuits $C'_1$ through $C'_4$ are provided with feedback current signals $i_1$ through $i_4$ from current detectors $CT_1$ through $CT_4$ and rotor (or wheel) speed signals $s_1$ through $s_4$ from speed detectors $TG_1$ through $TG_4$. The control circuits $C'_1$ through $C'_4$ produce gate signals $g_1$ through $g_4$ in response to the notch command n, direction command F/R, current signals $i_1$ through $i_4$ and speed signals $s_1$ through $s_4$. The gate signals are provided to the main circuits $T_1$ through $T_4$ in order to control the output current.

In the above individual control method, when there is a difference between the diameters of the wheels driven by the respective motors, the motors are separately controlled on each wheel and the torque of the motors can, therefore, be individually controlled. Since readhesion control can be accomplished when either a slip or slide (i.e., a deficiency in friction) occurs between the rail and the wheel, performance of the electric motor vehicle as a whole is improved. The term readhesion control refers to control which causes the wheel which is slipping or sliding to regain sufficient contact with the rail.

The induction motor can be controlled by reducing the "slip" (i.e. synchronized speed minus the actual rotor speed) in the induction motor. Since this "slip" produces a power loss associated with the induction motor, as the "slip" is reduced, the efficiency of the motor is improved.

When a slip or slide occurs between the rail and wheel, it is important that the condition be detected as soon as possible so that readhesion control can be applied. However, in the conventional individual control method, only the speed signal of the wheel on which a slip is to be detected is used as a source of information to detect when a slip (or slide) occurs. Utilizing only a single speed parameter to detect the condition of a slip (or slide) limits the ability to obtain maximum control.

SUMMARY OF THE INVENTION

It is an object of the present invention to provide an electric motor vehicle control apparatus in which the precision of detecting the occurrence of a slip (or slide) between the wheel and rail can be improved and the reliability of readhesion control can be improved. A slip or slide occurs when there exists some component of sliding friction between the wheels and rail. A slip may occur when the electric vehicle is accelerating and a slide when the vehicle is decelerating. The features of the instant invention can be readily applied to both occurrences with only slight modifications. Hence, the terms may at times be used interchangeably or singularly to denote both occurrences.

To achieve the above object according to the invention, there is provided an electric motor vehicle control apparatus including: (a) a device for generating a speed signal corresponding to the output of a plurality of motors; (b) a device for detecting the occurrence of a slip or a slide one of the plurality of motors by reference to the speed signals of all of the plurality of motors; and (c) a device for controlling a control frequency of the motor detected as experiencing a slip (or slide).

A further object of the invention is to provide a method for controlling an electric motor vehicle including the steps of: (a) detecting a speed of a plurality of motors driving the wheels of the vehicle; (b) detecting the occurrence of a slip of a wheel driven by one of the motors using a speed signal indicating the speed of each of the wheels on the vehicle; and (c) generating a control frequency to control the slipping wheel in order to eliminate the slip.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE PREFERRED EMBODIMENTS

Figure 1:
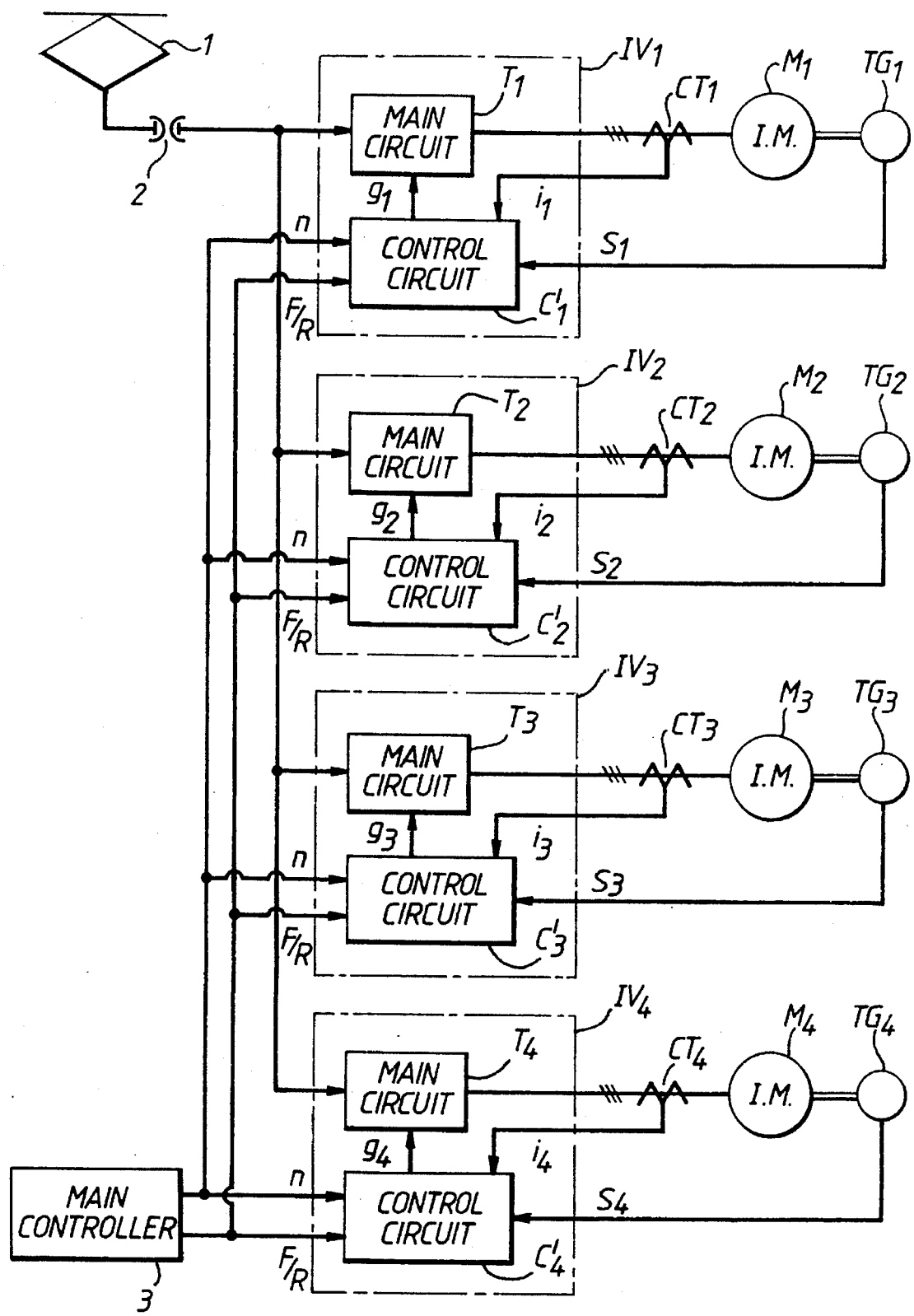
FIG. 1 is a schematic block diagram illustrating the structure of a prior art electric motor vehicle control apparatus.
Figure 2:
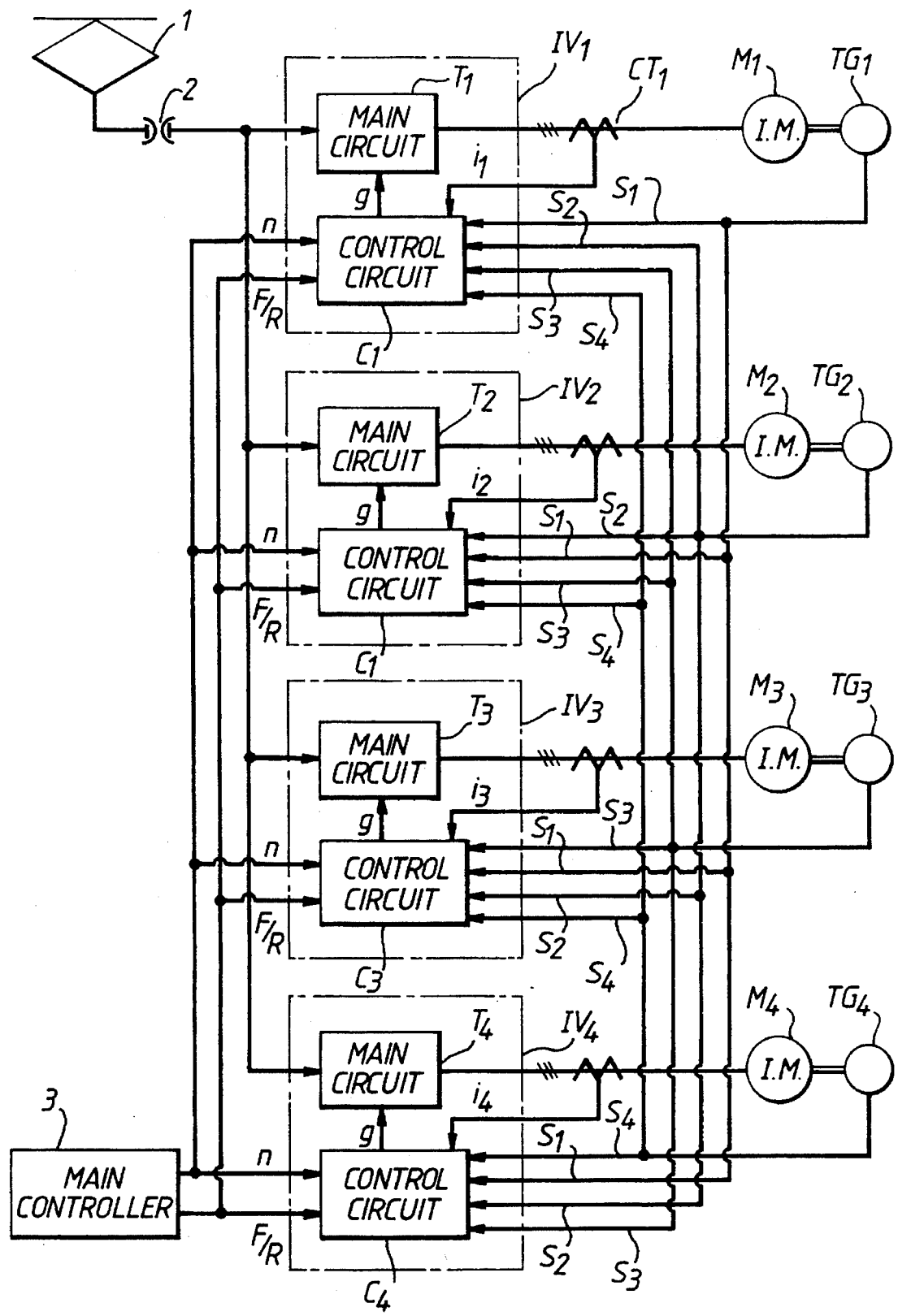
FIG. 2 is a schematic block diagram illustrating the structure of one embodiment of the invention.

FIG. 2 shows the structure of an electric motor vehicle control apparatus according to an embodiment of the invention. The elements in FIG. 2 which are the same as element shown in FIG. 1 are given the same reference identifiers. Referring to FIG. 2, a control circuit $C_1$, located in inverter apparatus $IV_1$, receives a speed signal $s_1$ from a speed detector $TG_1$ coupled to induction motor $M_1$. Control circuit $C_1$ also receives speed signals $s_2$ through $s_4$ from speed detectors $TG_2$ through $TG_4$. Similarly, each control circuit, $C_2$ through $C_4$, receive speed signals $s_1$ through $s_4$ from all of the speed detectors $TG_1$ through $TG_4$.

Figure 3:
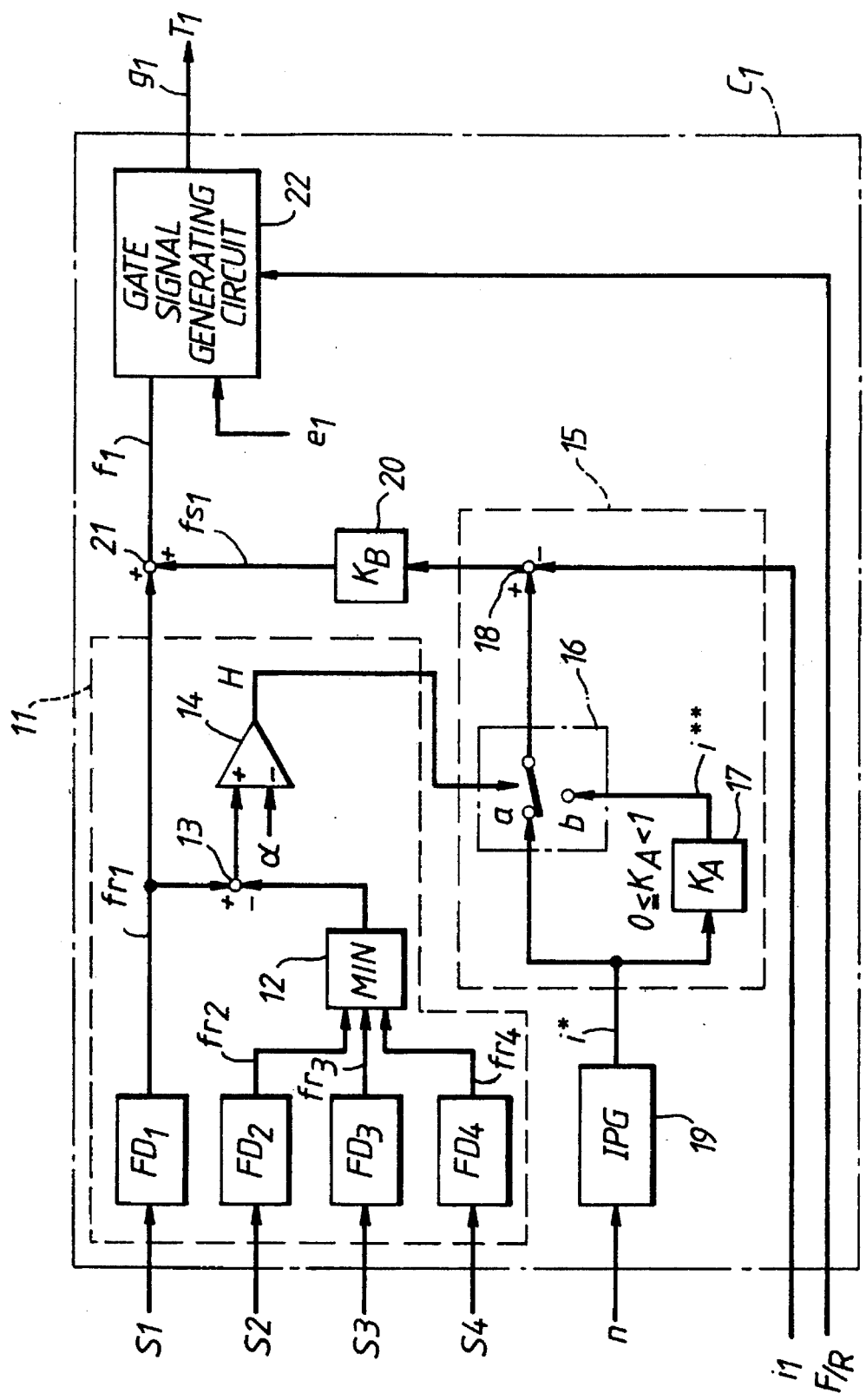
FIG. 3 is a block diagram illustrating the structure of a control circuit of the first embodiment of the invention.

FIG. 3 shows the structure of control circuits $C_1$ through $C_4$ according to a first embodiment of the invention. According to FIG. 3, the control circuit $C_1$ comprises a slip detection circuit 11, a frequency control circuit 15, a current reference pattern forming circuit 19, a gain circuit 20 having a gain constant $K_B$, an adder 21 and a gate signal generating circuit 22. Slip detection circuit 11 comprises frequency operation circuits $FD_1$ through $FD_4$, minimum value selection circuit 12, subtractor 13 and comparator 14. The frequency control circuit 15 comprises a switch 16, a gain circuit 17 having a gain constant $K_A$ and a subtractor 18. The gain constant $K_A$ and $K_B$ are selected optionally within a range greater than or equal to than 0 (zero) and less than 1 (i.e., $0 \leq K_A$ and $K_B < 1$).

The operation of the slip detection circuit 11 will be described below in reference to control circuit $C_1$; however, the remaining control circuits are similarly constructed.

During normal operation, a notch command n is provided to the control circuit, e.g., $C_1$, and a current reference signal i*, corresponding to the notch signal n, is output from the current reference pattern forming circuit 19. The current reference pattern forming circuit may include, for example, a table for looking up the value of current reference signal i* which corresponds to the input notch signal n. The current reference signal i* is provided to a positive side of the subtractor 18 through the switch 16a and may be thought of as corresponding to a desired speed. A current detection signal $i_1$, from a current detector $CT_1$, is provided to a negative side of the subtractor 18 which calculates the difference between the current reference signal i* and current detection signal $i_1$. The calculated difference is output to the gain circuit 20. The gain circuit 20 produces a control frequency signal $fs_1$ in response to the difference from the subtractor 18. The control frequency signal $fs_1$ is input to the adder 21.

The speed detection signal $s_1$ is provided to the frequency operation circuit $FD_1$. The frequency operation circuit $FD_1$ produces a rotor frequency signal $fr_1$ in response to the speed detection signal $s_1$ from the speed detector $TG_1$. The frequency operation circuit may, for example, comprise a voltage to frequency converter. The produced rotor frequency signal $fr_1$ is provided to the adder 21. The adder 21 adds the rotor frequency signal $fr_1$ and the control frequency signal $fs_1$ and outputs the added result as a frequency command signal $f_1$. The frequency command signal $f_1$ is provided to the gate signal generating circuit 22. The gate signal generating circuit 22 receives an output voltage reference signal $e_1$ and direction signal F/R (F indicating forward and R indicating reverse) in addition to the frequency command signal $f_1$. The gate signal generating circuit 22 produces a gate signal $g_1$ in response to signals $e_1$, F/R and $f_1$. The gate signal $g_1$ is provided to main circuit $T_1$ of the inverter apparatus $IV_1$ for control of the induction motor $M_1$. The gate signal generating circuit 22 may comprise, for example, a pulse width modulation control circuit which generates an output $g_1$ in response to the reference voltage value $e_1$ and the desired frequency $f_1$.

The above operation occurs in the normal operation mode (i.e., when no slip is occurring). The operation of the slip detection circuit 11 will now be described. In addition to the above described operation, the speed signals $s_2$ through $s_4$ from the speed detectors $TG_2$ through $TG_4$ are also provided to the slip detection circuit 11. Frequency operation circuits $FD_2$ through $FD_4$ convert the speed signals $s_2$ through $s_4$ into the rotor frequency signals $fr_2$ through $fr_4$ respectively.

The minimum value selection circuit 12 selects the minimum rotor frequency signal of the rotor frequency signals $fr_2$ through $fr_4$. The minimum value is output to the negative side of the subtractor 13. By choosing the rotor frequency signal having the minimum value, the speed associated with a wheel which is least likely to be currently slipping is chosen.

The rotor frequency signal $fr_1$ is provided to the positive side of the subtractor 13 which calculates a difference between the minimum signal of the rotor frequency signals $fr_2$ through $fr_4$ and the rotor frequency signal $fr_1$. Subtractor 13 provides the difference to the positive terminal of the comparator 14. A set value $\alpha$ is provided to the negative terminal of the comparator 14. When the difference between the value provided by subtractor 13 and the set value $\alpha$ reaches a fixed level, the comparator 14 outputs a signal H which indicates that the wheel is slipping.

As the wheel driven by the motor $M_1$ begins to slip, the value of the rotor frequency signal $fr_1$ increases sharply. However, since the value output from the minimum value selection circuit 12 does not change (assuming at least one other wheel is not slipping), the output from the subtractor 13 increases significantly. Consequently, the signal H is output to the switch 16 as a slip detection signal from the comparator 14.

Upon detection of a slip signal H from comparator 14, switch 16 switches from side a to side b. Accordingly, the current reference signal i* output from the current reference pattern forming circuit 19 passes through the gain circuit 17. Gain circuit 17 attenuates the current reference signal i* according to the gain constant $K_A$. The attenuated current reference signal i** is provided to the positive side subtractor 18 instead of the current reference signal i*. Consequently, the frequency command signal $f_1$ being the sum of the control frequency signal $fs_1$ and rotor frequency signal $fr_1$ is decreased, and readhesion control is accomplished on the wheel which is slipping.

In the slip detection circuit 11 according to the instant invention, in addition to the speed signal $s_1$ from the speed detector $TG_1$ associated with the slipping wheel, the speed signals $s_2$ through $s_4$ from the other speed detectors $TG_2$ through $TG_4$ are used to detect when the slip occurs. As a result it is possible to detect the slip more reliably and exactly than with conventional control methods.

Figure 4:
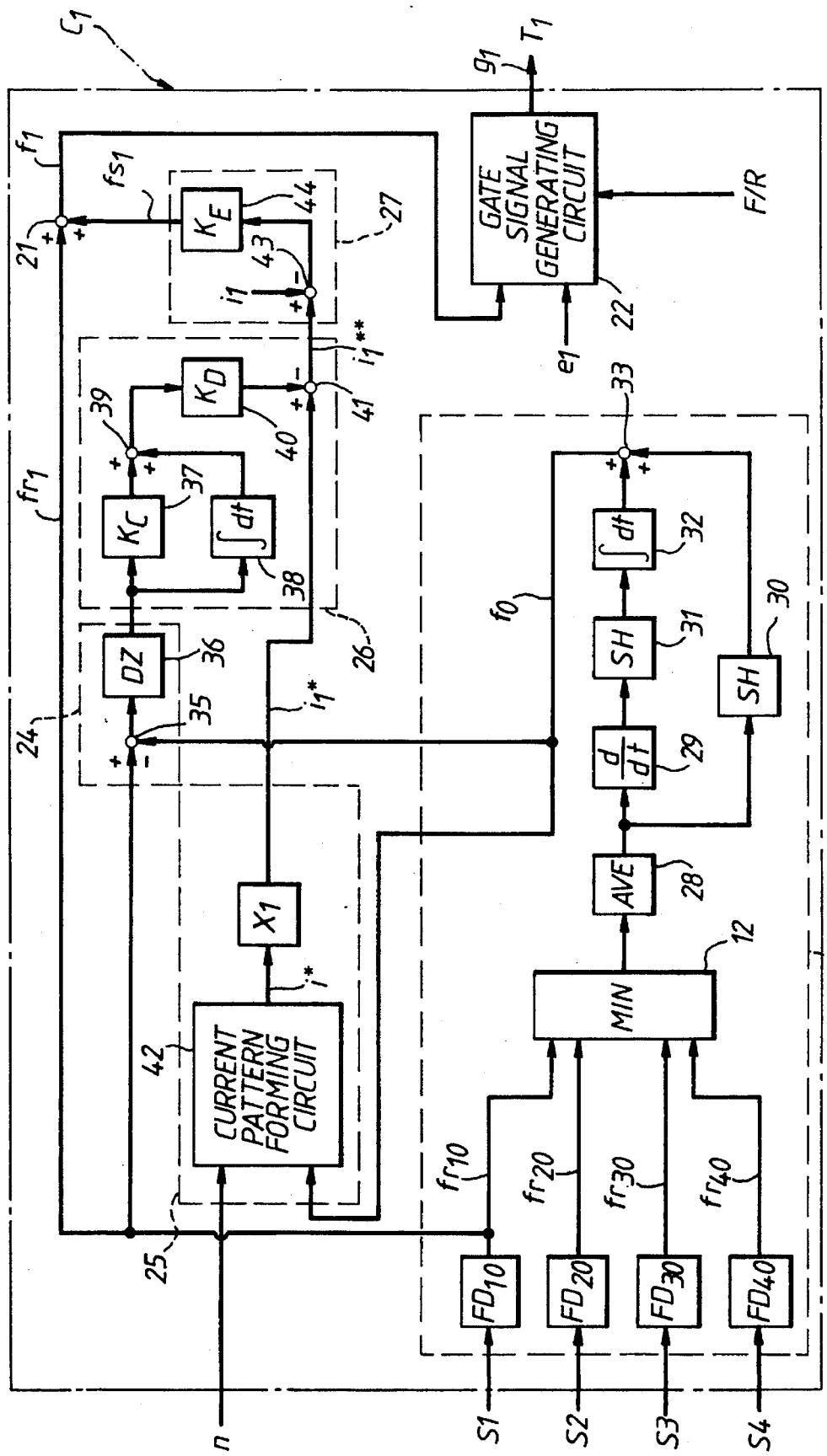
FIG. 4 is a block diagram illustrating the structure of a control circuit of a second embodiment of the invention.

Next a second embodiment of the invention will be explained with reference to FIG. 4. In FIG. 4, a control circuit $C_1$ comprises a vehicle speed operation circuit 23, slip detection circuit 24, current reference generation circuit 25, current reference control circuit 26 and frequency output circuit 27.

Frequency operation circuits $FD_{10}$ through $FD_{40}$ of the vehicle speed operation circuit 23 convert speed signals $s_{10}$ through $s_{40}$ into rotor frequency signals $fr_{10}$ through $fr_{10}$, respectively, and provide the rotor frequency signals $fr_{10}$ through $fr_{40}$ to the minimum value selection circuit 12. The minimum value selection circuit 12 selects the signal having the minimum value of the rotor frequency signals $fr_{10}$ through $fr_{40}$, and provides the selected signal to a time average circuit 28. The time average circuit 28 averages the selected signal for a sampling period and provides the calculated average to a differential circuit 29 and a sample-and-hold circuit 30. The output from the differential circuit 29 is also sent to a sample-and-hold circuit 31, and then is provided to an integral circuit 32. The integral circuit 32 integrates the output from the sample-and-hold circuit 31. An adder 33 adds the output from the sample-and-hold circuit 30 which represents the average minimum speed and the output from the integral circuit 32 which represents the average change in minimum speed. The added value is an estimate of the vehicle speed and is represented by vehicle speed signal $f_0$. The vehicle speed signal $f_0$ is a signal which has a frequency which represents an estimated speed of the vehicle.

A subtractor 35 of the slip detection circuit 24 inputs the rotor frequency signal $fr_{10}$ from the frequency operation circuit $FD_{10}$ and the vehicle speed signal $f_0$ from the adder 33. Subtractor 35 calculates a difference between signals $fr_{10}$ and $f_0$. The difference is provided to a dead band circuit 36. The dead band circuit 36 provides a signal to the current reference control circuit 26 when the difference output from the subtractor 35 reaches a fixed level. The slip detection signal from the dead band circuit 36 indicates that a slip is detected. This signal represents a slip detection since the rotor frequency signal $fr_{10}$ is larger than the vehicle speed signal $f_0$ when a slip occurs at the wheel driven by the motor $M_1$.

In the current reference control circuit 26, the slip detection signal is provided to and operated on by a proportional circuit 37 having a proportional constant $K_C$ and an integral circuit 38. The outputs from the proportional circuit 37 and integral circuit 38 are added by the adder 39. The added value from the adder 39 is provided to a negative side of a subtractor 41 via a gain circuit 40 having a gain constant $K_D$.

The current reference generation circuit 25 uses a current reference pattern forming circuit 42 instead of the current reference pattern forming circuit 19 shown in FIG. 3. Current reference pattern forming circuit 42 produces a current reference signal i* in response to both the notch command n and the vehicle speed signal $f_0$. The current reference pattern forming circuit 42 may include, for example, a table for looking up the value of i* as a function of both the notch comand and the vehicle speed. The current reference signal i* is corrected by a correction circuit $X_1$. The corrected current reference signal $i_1$* is provided from the correction circuit $X_1$ to a positive side of the subtractor 41 in the current reference control circuit 26. The current pattern forming circuits 42 of the control circuits $C_1$ through $C_4$ are the same. Accordingly, the current pattern forming circuit 42 of the control circuit $C_1$ can be used by all of the control circuits $C_1$ through $C_4$, thus eliminating the need for current pattern forming circuits in control circuits $C_2$ through $C_4$.

The subtractor 41 in the current reference control circuit 26 calculates a difference between the output from the gain circuit 40 and the corrected current reference signal $i_1$* from the correction circuit $X_1$, and provides the difference as an attenuated current reference signal $i_1$ to the frequency output circuit 27. A subtractor 43 in the frequency output circuit 27 calculates a difference between the attenuated current reference signal $i_1$ and a current detection signal $i_1$, and provides the difference to a gain circuit 44 having a gain constant $K_E$. The gain circuit 44 produce the control frequency signal $fs_{10}$ in response to the difference and gain constant $K_E$. The frequency command signal $f_1$ and gate signal $g_1$ are then produced as in the embodiment of FIG. 3.

According to the above embodiment, the control frequency signal $fs_{10}$ is determined by comparing the rotation speed of the wheel $fr_{10}$ and the vehicle speed signal $f_0$. In this manner, the generation of slip can be detected with certainly.

Next the correction circuit $X_1$ will be explained in detail with reference to FIG. 5.

Figure 5:
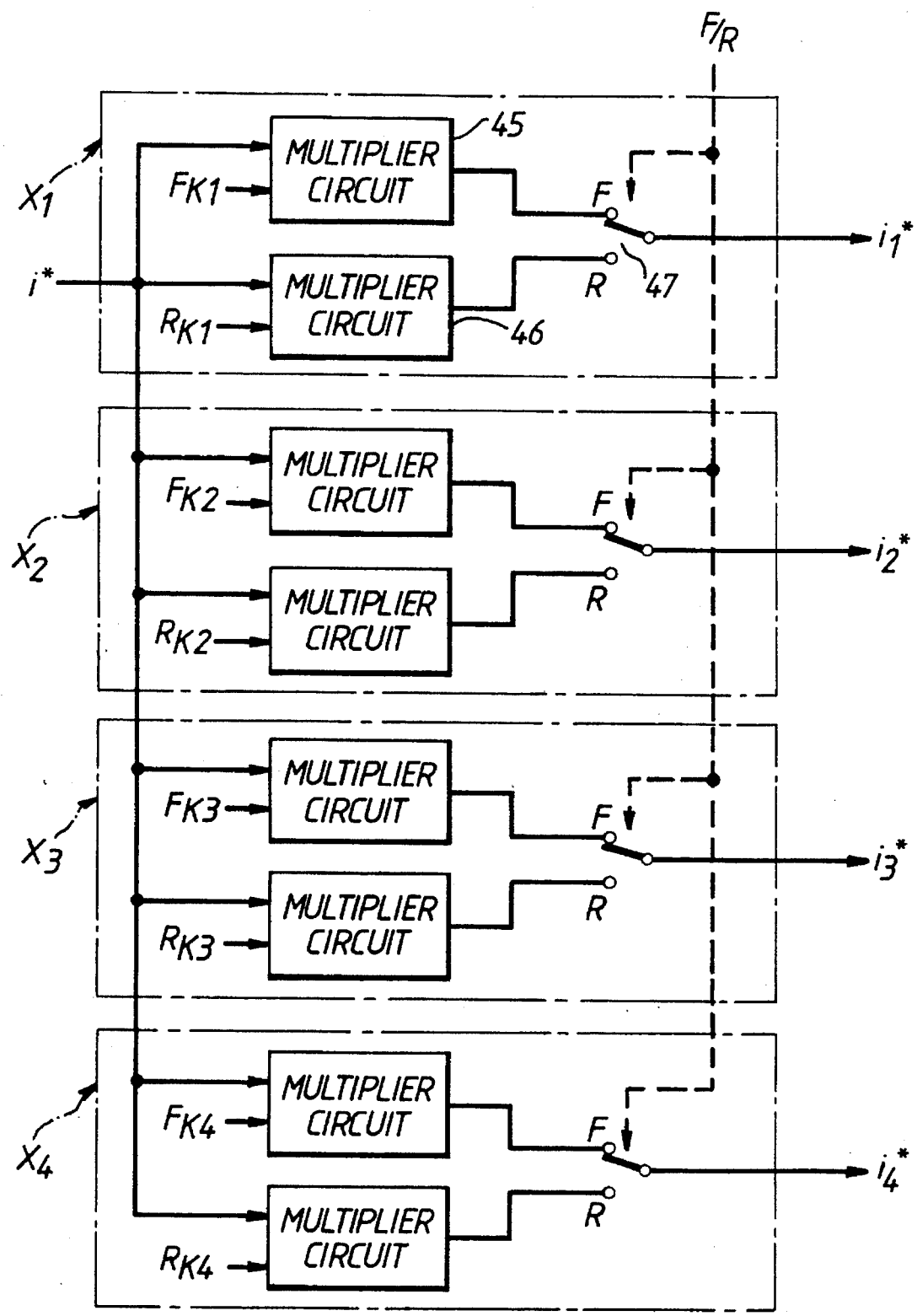
FIG. 5 is a block diagram illustrating the structure of a correction circuit of a third embodiment of the invention.

Since the current reference signal i* from the current reference pattern forming circuit 42 of the control circuit $C_1$ is used in common by the correction circuits $X_1$ through $X_4$, the correction circuits $X_2$ through $X_4$ are also shown in FIG. 5 with the correction circuit $X_1$.

Referring to FIG. 5, the correction circuit $X_1$ comprises multiplier circuits 45 and 46 and a switch 47. The multiplier circuit 45 multiplies the current reference signal i* and a correction coefficient $F_{K1}$, and the multiplier circuit 46 multiplies the current reference signal i* and a correction coefficient $R_{K1}$. The correction coefficient $F_{K1}$ is used when the direction of moving of the vehicle is a forward direction, and the correction coefficient $R_{K1}$ is used when the direction of moving of the vehicle is a reverse direction.

The direction command F/R from the main controller 3 is provided to the switch 47. When the direction command F is provided to the switch 47, a contact of the switch 47 is connected to a side F. Further, when the direction command R is provided to the switch 47, the contact of the switch 47 is connected to a side R. Accordingly, the current reference signal i* from the current reference pattern forming circuit 42 is corrected in response to the direction of moving of the vehicle, and the corrected current reference signal $i_1$* is produced.

The reason why the current reference signal i* is corrected in response to the direction of moving of the vehicle will be described below.

Generally, a wheel located at and around the front of the moving vehicle (front being determined by the direction the vehicle is moving) has a decrease of adhesion activity due to the presence of water, snow, oil, and the like on the track. Further, the distribution of axle load changes in response to the direction of moving of the vehicle as a result of "axle load movement." Consequently, the maximum rotational force which may be applied to each wheel without causing a slip changes with the direction of the moving vehicle. However, since the correction circuits $X_1$ through $X_4$ shown in FIG. 5 correct the current reference signal i* in response to the direction of moving of the vehicle, a suitable corrected current reference signals $i_1$* through $i_4$* can be obtained for the motors $M_1$ through $M_4$. A value near the maximum rotational force which can be applied to each wheel may be chosen and the electric powered vehicle can be operated while preventing the wheels from slipping.

Next, a fourth embodiment of the invention will be explained with reference to FIG. 6. In this embodiment, when the vehicle speed signal $f_0$ is calculated, a difference between the diameters of the wheels is also considered.

Figure 6:
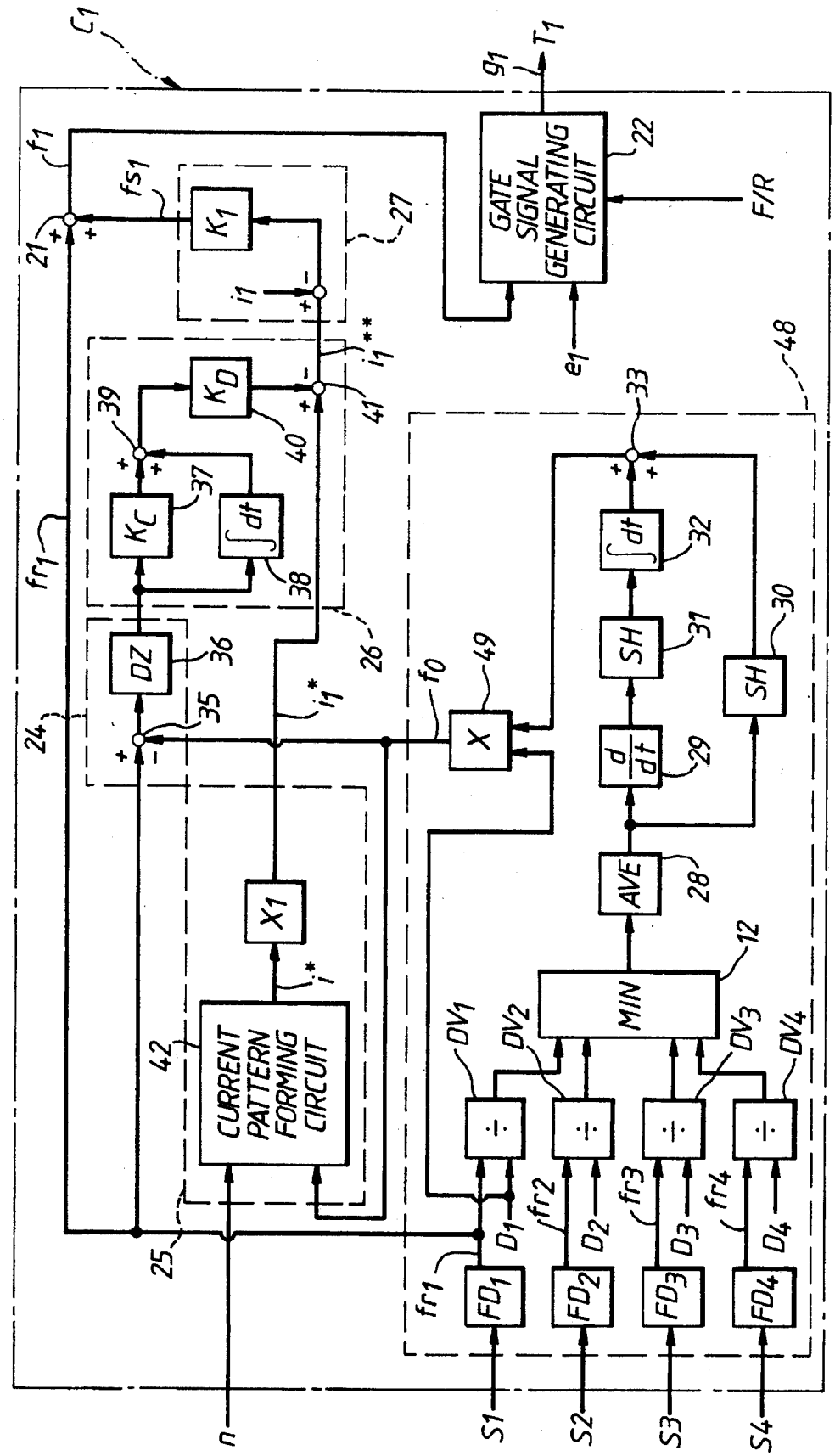
FIG. 6 is a block diagram illustrating the structure of a control circuit of a fourth embodiment of the invention.

Referring to FIG. 6, a vehicle speed operation circuit 48 has division circuits $DV_1$ through $DV_4$, respectively located between frequency operation circuits $FD_{10}$ through $FD_{40}$ and minimum value selection circuit 12. The rotor frequency signals $fr_{10}$ through $fr_{40}$ are divided by the diameters $D_1$ through $D_4$ of the wheels, respectively. The diameters $D_1$ through $D_4$ are predetermined. The output from the adder 33 is multiplied by the diameter $D_1$ by multiplier 49, and the vehicle speed signal $f_0$ is thus produced. The operation of other elements and circuits depicted in FIG. 6 corresponding to those in FIG. 4 remains the same and therefore a detailed explanation is not reproduced.

Next, a fifth embodiment will be explained with reference to FIGS. 7 and 8.

Figure 7:
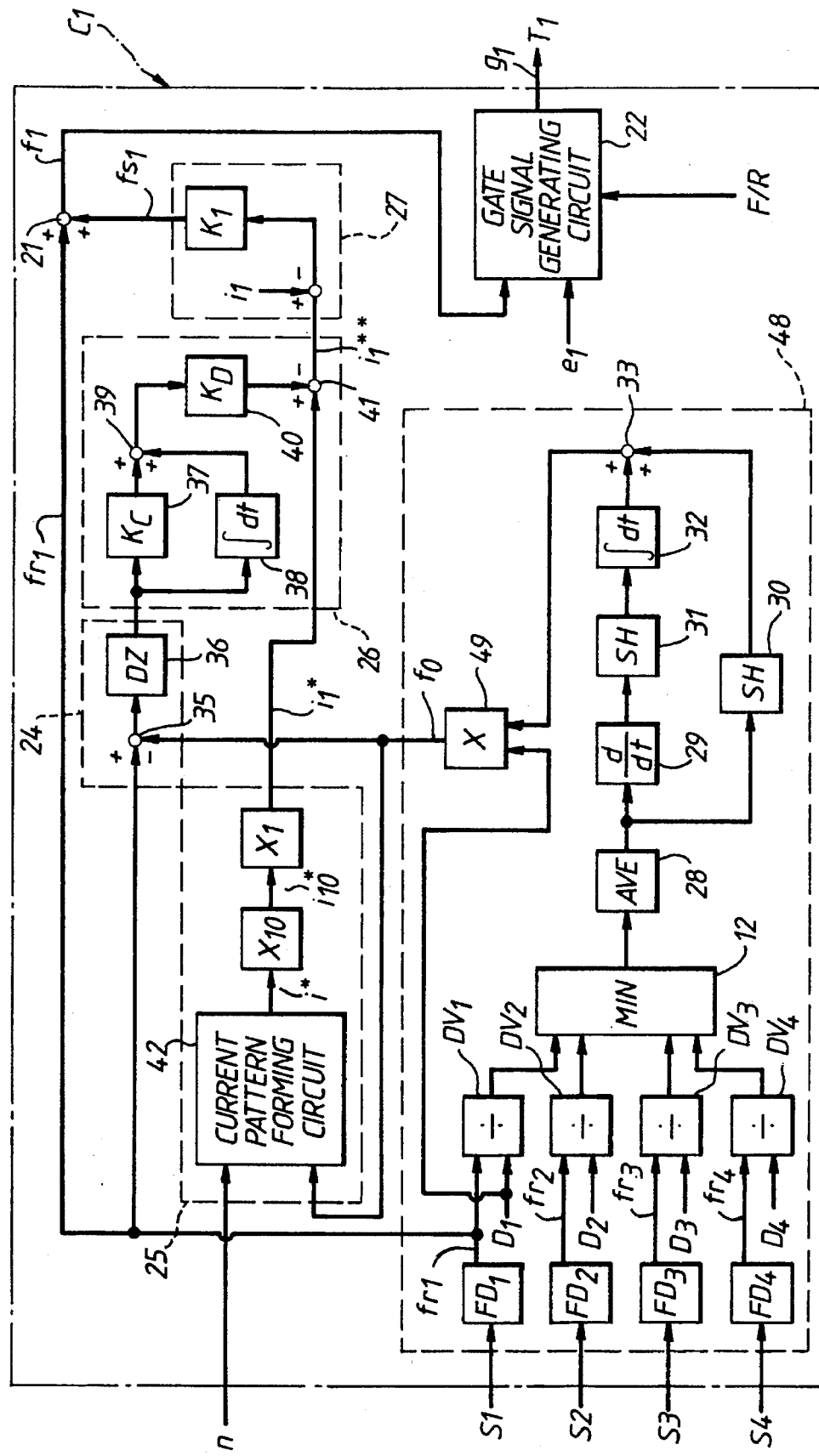
FIG. 7 is a block diagram illustrating the structure of a control circuit of a fifth embodiment of the invention.
Figure 8:
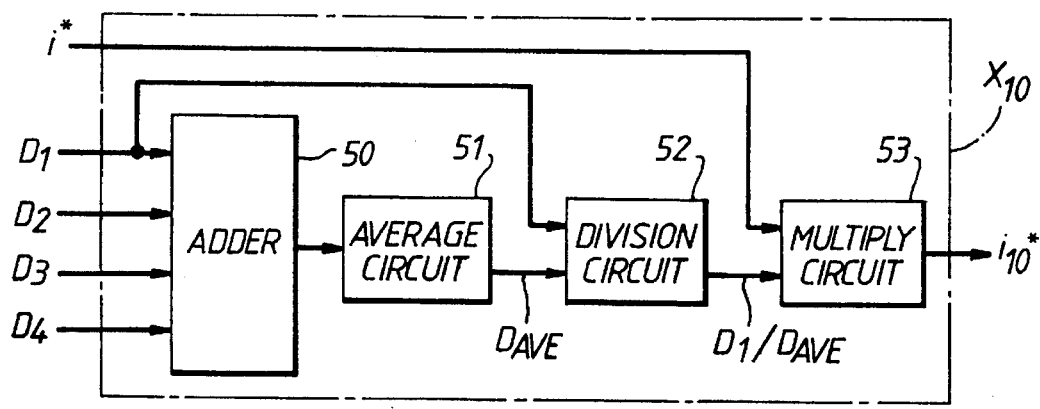
FIG. 8 is a block diagram illustrating the structure of a correction circuit of a fifth embodiment of the invention.

Referring to FIG. 7, a correction circuit $X_{10}$ is provided between the current reference pattern forming circuit 42 and correction circuit $X_1$. FIG. 8 shows the details of the correction circuit $X_{10}$. An adder 50, average circuit 51, division circuit 52 and multiply circuit 53 are provided. The adder 50 totals the diameters $D_1$ through $D_4$ and provides the totaled value to the average circuit 51. The average circuit 51 calculates the average value $D_{AVE}$ of the diameters $D_1$ through $D_4$. In this manner, equal torque may be applied to each motor using the average value $D_{AVE}$. The division circuit 52 divides the diameter $D_1$ by the average value $D_{AVE}$ in order to produce a rate $D_1/D_{AVE}$. The multiply circuit 53 multiplies the current reference signal i* from the current reference pattern forming circuit 42 by the rate $D_1/D_{AVE}$, and a new current reference signal $i_{10}$* is produced. Accordingly, as the new current reference signal $i_{10}$* has a value in response to the diameter $D_1$, the signal $i_{10}$* is a more suitable current reference signal to control the motor $M_1$.

Figure 9:
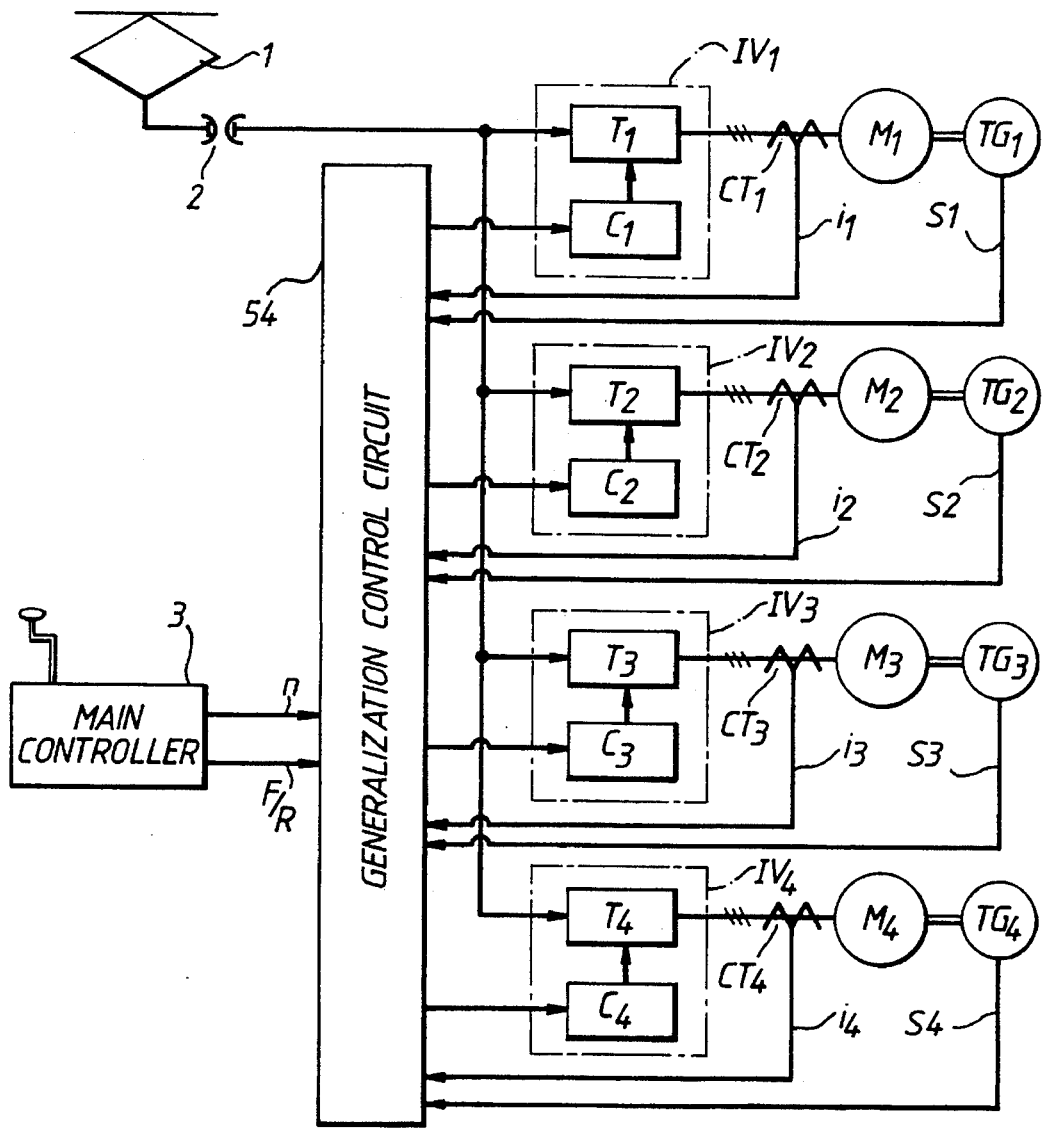
FIG. 9 is a schematic block diagram illustrating the structure of a sixth embodiment of the invention.

Next a sixth embodiment of the invention will be explained with reference to FIG. 9.

In this embodiment a generalization control circuit 54 is provided and separatable elements of the control circuits $C_1$ through $C_4$ are moved into the generalization control circuit 54. The generalization control circuit 54 receives the notch command n and direction command F/R from the main controller 3. Current signals $i_1$ through $i_4$ from the current detectors $CT_1$ through $CT_4$ and speed signals $s_1$ through $s_4$ from the speed detectors $TG_1$ through $TG_4$ are also provided to the generalization control circuit 54. In this embodiment, all common elements in the individual control apparatus are consolidated into a generalized circuit thereby eliminating unneeded duplicate elements. In other words, a single circuit performs the same function for all of the control apparatus, thereby reducing size and cost.

In the above embodiments, the situation of wheel slip during the power running is described. However, this invention may be used for the case of wheel sliding during a reduction in speed of the vehicle.

For instance, when a slide occurs, a maximum value selection circuit, which selects the signal having the maximum value of the rotor frequency signals $fr_2$ through $fr_4$, is used instead of the minimum value selection circuit 12 shown in FIG. 3. Further, a subtractor is used instead of the adder 21 and the control frequency signal $fs_1$ is input to the negative side of the subtractor.

Further, while the invention shown in FIGS. 4–9 illustrate the use of discrete components, the invention may also be implemented using a microprocessor to perform the various logical and mathematical functions described.

As described above, according to this invention, since all of the speed signals of the plurality of motors are used to detect the slip (or slide) and to perform the readhesion control, the precision of detecting the slip and reliability of the readhesion control is improved.

What is claimed is:

1. An electric motor vehicle control apparatus comprising:
   a plurality of motors;
   means for generating speed signals corresponding to a detected motor speed of each of said plurality of motors;
   detecting means for detecting a wheel slip or slide occurring at a wheel driven by one of said plurality of motors in response to a minimum speed signal or a maximum speed signal of said speed signals, respectively, and for producing a detection signal corresponding thereto; and
   a control circuit receiving said detection signal and responsive to said speed signal corresponding to said one of said plurality of motors, said control circuit generating a control signal for controlling the speed of said one of said plurality of motors.

2. An electric motor vehicle control apparatus for controlling one of a plurality of motors comprising:
   a plurality of speed detecting means, each coupled to a different one of said plurality of motors respectively, for detecting a speed of each of said motors and for outputting a speed signal corresponding thereto;
   detecting means for detecting a wheel slip occurring at a wheel driven by one of said plurality of motors in response to a minimum speed signal of said speed signals from said plurality of speed detecting means and for generating a detection signal corresponding thereto; and
   control means responsive to said detection signal and said speed signal corresponding to said one of said plurality of motors for generating a control signal for controlling the speed of said one of said plurality of motors.

3. An electric motor vehicle control apparatus comprising:
   speed detecting means, coupled to a plurality of motors respectively, for detecting a speed of each of said motors and for producing a corresponding plurality of speed signals;
   current detecting means for detecting current supplied to one of said plurality of motors and for outputting a current signal in accordance with said detected current;
   vehicle speed operation means for calculating a vehicle speed from all of said plurality of speed signals from said speed detecting means;
   detection means for detecting a wheel slip or slide occurring at a wheel driven by said one of said plurality of motors in response to said vehicle speed from said vehicle speed operation means and said speed signal corresponding to said one of said plurality of motors;
   current reference generating means for generating a current reference signal in response to said vehicle speed from said vehicle speed operation means and a setting value;
   current reference control means for controlling said current reference signal from said current reference generating means in response to said wheel slip or slide detected by said detection means;
   frequency output means for producing a control frequency signal in response to said controlled current reference signal from said current reference control means and said current signal from said current detecting means; and
   means responsive to said control frequency signal for controlling the speed of said one of said plurality of motors.

4. The apparatus recited in claim 3, wherein said current reference generating means further comprises a correction circuit wherein said current reference signal is multiplied by a fixed coefficient being set in response to a direction of movement of said vehicle.

5. The apparatus recited in claim 3, wherein said vehicle speed operation means includes means for calculating said vehicle speed based on a difference between diameters of wheels driven by said plurality of motors.

6. A method for controlling one of a plurality of motors in an electric motor vehicle control apparatus comprising the steps of:

generating speed signals corresponding to an output of each of said plurality of motors;

detecting a friction deficiency at a wheel driven by said one of said plurality of motors using one of a maximum and a minimum speed signal of said speed signals corresponding to each of said plurality of motors;

generating a control signal when said friction deficiency is detected such that said friction deficiency is corrected; and utilizing said control signal to control said one of said plurality of motors.

7. A method as recited in claim 6 wherein said detecting step includes the steps of:

calculating a vehicle speed from said one of said maximum and said minimum speed signal; and comparing said vehicle speed with said speed signal corresponding to said one of said plurality of motors to detect if said friction deficiency is occurring at said wheel driven by said one of said plurality of motors.

8. A method as recited in claim 6, wherein the maximum speed signal is used to detect a friction deficiency corresponding to a wheel slide and the minimum speed signal is used to detect a friction deficiency corresponding to a wheel slip.

9. A method as recited in claim 7 further comprising the steps of:

detecting a current supplied to said one of said plurality of motors and generating a current signal in response thereto;

generating a current reference signal from said vehicle speed and a setting value; and controlling said current reference signal according to said detection of said friction deficiency; and wherein said step of generating said control signal includes producing said control signal in response to said current reference signal and said current signal.

10. A method as recited in claim 9 further comprising the step of correcting said current reference signal in accordance with a direction of movement of said vehicle.

11. A method as recited in claim 9 wherein said vehicle speed calculation step further comprising the step of adjusting each of speed signal according to a diameter of said wheel.

* * * * *